(12) United States Patent
Inui

(10) Patent No.: US 8,448,579 B2
(45) Date of Patent: May 28, 2013

(54) ARTICLE TRANSPORT FACILITY

(75) Inventor: Yoshitaka Inui, Omihachiman (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 13/514,161

(22) PCT Filed: Oct. 22, 2010

(86) PCT No.: PCT/JP2010/068722
§ 371 (c)(1),
(2), (4) Date: Aug. 15, 2012

(87) PCT Pub. No.: WO2011/070861
PCT Pub. Date: Jun. 16, 2011

(65) Prior Publication Data
US 2012/0312188 A1 Dec. 13, 2012

(30) Foreign Application Priority Data
Dec. 7, 2009 (JP) .................................. 2009-277732

(51) Int. Cl.
*A63H 18/12* (2006.01)
(52) U.S. Cl.
CPC ..................................... *A63H 18/12* (2013.01)
USPC .......................... 104/288; 104/287; 104/88.01
(58) Field of Classification Search
USPC ...... 104/287, 288, 300, 88.01, 88.02; 105/49, 105/52–54, 61, 96; 213/88, 89
See application file for complete search history.

(56) References Cited

U.S. PATENT DOCUMENTS

| 5,540,319 | A  | * | 7/1996  | Orisaka et al. | ............. 198/465.3 |
| 6,220,173 | B1 | * | 4/2001  | Sauerwein      | ............... 104/130.01 |
| 6,591,961 | B2 | * | 7/2003  | Fukushima      | ................ 198/346.2 |
| 7,845,284 | B2 | * | 12/2010 | Izumi et al.   | ................ 104/88.02 |
| 8,245,647 | B2 | * | 8/2012  | Oguro et al.   | .................... 104/96 |
| 8,322,287 | B2 | * | 12/2012 | Oguro et al.   | ..................... 104/91 |
| 2006/0016363 | A1 | * | 1/2006  | Nakao et al. | ............... 104/88.01 |
| 2006/0230975 | A1 | * | 10/2006 | Shiwaku      | ..................... 104/88.01 |
| 2010/0242783 | A1 | * | 9/2010  | Oguro et al. | ..................... 104/91 |
| 2010/0242784 | A1 | * | 9/2010  | Oguro et al. | ............. 104/130.01 |
| 2011/0061559 | A1 | * | 3/2011  | Lund         | ............................ 104/119 |
| 2012/0305364 | A1 | * | 12/2012 | Morimoto et al. | ........ 198/370.01 |
| 2012/0312188 | A1 | * | 12/2012 | Inui         | .............................. 104/288 |

FOREIGN PATENT DOCUMENTS

| JP | 8186904 A  | 7/1996  |
| JP | 8205309 A  | 8/1996  |
| JP | 9132323 A  | 5/1997  |
| JP | 9284906 A  | 10/1997 |
| JP | 10234101 A | 9/1998  |
| JP | 200278102 A | 3/2002 |

* cited by examiner

*Primary Examiner* — Jason C Smith
(74) *Attorney, Agent, or Firm* — The Webb Law Firm

(57) ABSTRACT

An article transport facility in which electricity can be supplied properly from an electricity supply line to a power receiving portion even in a curved portion of a predetermined travel path without providing the power receiving portion to a connecting shaft. An article transport vehicle includes a travel portion having a guide wheel and a travel wheel that contacts the travel rail and is driven. The travel portion is connected to the vehicle main body by a connecting shaft. The power receiving portion is supported by the vehicle main body such that the power receiving portion can be moved in the lateral direction of the article transport vehicle. The article transport vehicle includes means for moving the power receiving portion outwardly of the curved portion of the article transport vehicle in association with the rotation of the connecting shaft when the travel portion rotates while traveling in the curved portion.

6 Claims, 13 Drawing Sheets

(a)

(b)

(a)

(b)

ARTICLE TRANSPORT FACILITY

BACKGROUND OF THE INVENTION

1. Field of the Invention

The present invention relates to an article transport facility comprising a travel rail and an article transport vehicle that includes a power receiving portion to which driving electric power is supplied contactlessly from an electricity supply line provided along the travel rail and that is capable of traveling while being guided by the travel rail.

2. Description of the Related Art

Article transport facilities such as one described above are article transport facilities in which articles are transported along the tracks, and in which electric power to allow article transport vehicles is supplied from an electricity supply line arranged along travel rails to a power receiving portion provided to the article transport vehicles without contact. And in order to properly supply electricity to the power receiving portion from the electricity supply line, the positional relationship between the electricity supply line and the power receiving portion must be maintained within a proper range in which electric power can be supplied (for example, range in which the power receiving portion and the electricity supply line overlap each other in the vertical direction). To this end, by arranging the electricity supply line to extend along the travel rail, and by having the article transport vehicles travel along the travel rail, article transport vehicles are caused to travel while maintaining the positional relationship, in the lateral direction of the article transport vehicle, between the electricity supply line and the power receiving portion to be within a proper range in which electric power can be supplied.

In such article transport facility of a type where articles are transported along the tracks, predetermined travel paths are formed by combining straight portions and curved portions as travel paths along which the article transport vehicle travel. And the travel rails and the electricity supply lines are arranged to extend along the set travel paths. And in order to allow the article transport vehicles to travel smoothly even in curved portions of the predetermined travel paths, the article transport vehicles include guide wheels which are guided with respect to the horizontal direction by contacting the travel rail, and a travel portion having travel wheels which contact and are drivingly rotated on, the travel rail, with the travel portion rotatably connected about a vertical axis to a vehicle main body portion with a connecting shaft. Thus, when an article transport vehicle travels in a curved portion of a predetermined travel path, the travel portion rotates about the vertical axis with respect to the vehicle main body portion by means of the connecting shaft as the travel portion travels along the travel rail. This allows article transport vehicles to travel smoothly even in curved portions.

As described above, the travel portion travels along the travel rail as it rotates about the vertical axis with respect to the vehicle main body portion. Therefore, when a pair of front and back travel portions is provided, for example, the trajectory of the vehicle main body portion is displaced from a trajectory that extends along the curved portion (i.e., the trajectory is displaced inwardly from one that extends along the curved portion) whereas the trajectory of the travel portion extends along the curved portion. Especially, for example, when the curved portion is formed to have a circular shape, the smaller the radius of the curved portion is, to the greater degree the trajectory of the vehicle main body is displaced from a trajectory that extends along the curved portion. Thus, when the power receiving portion is provided to the vehicle main body, the power receiving portion will move inwardly of the curved portion in the curved portion with respect to the electricity supply line arranged along the curved portion, which increases the distance between the electricity supply line and the power receiving portion in the lateral direction of the article transport vehicle. It thus becomes impossible to maintain the positional relationship, between the electricity supply line and the power receiving portion in the lateral direction of the article transport vehicle, to be within a proper range in which electric power can be supplied. And it may become impossible to properly supply electricity from the electricity supply line to the power receiving portion.

To this end, in a conventional article transport facility, the power receiving portion is configured to be rotatable about a vertical axis with respect to the vehicle main body by means of an vertically extending axis. And the power receiving portion is provided with a roller which contacts the travel rail to be guided thereby and a spring that urges the roller into contact with the travel rail (see, for example, Patent Document 1). In the facility of Patent Document 1, the roller contacts the travel rail to be guided thereby under the urging force of the spring when traveling in a curved portion, and the power receiving portion rotates about the vertical axis with respect to the vehicle main body and thus moves along the travel rail. Therefore, since the trajectory of the power receiving portion in a curved portion becomes a trajectory that extends along the curved portion, the positional relationship between the electricity supply line and the power receiving portion can be maintained within a proper range in which electric power can be supplied, making it possible for electricity to be properly supplied to the power receiving portion from the electricity supply line.

PRIOR ART REFERENCE PATENT DOCUMENTS

Patent Document 1: JP Patent Publication No. 3298348

SUMMARY OF THE INVENTION

Since the power receiving portion is rotatable with respect to the vehicle main body about a vertical axis in the facility described in Patent Document 1 described above, both the travel portion and the power receiving portion are rotatable with respect to the vehicle main body about a vertical axis. And usually, by providing the power receiving portion on the connecting shaft for connecting the vehicle main body and the travel portion, the power receiving portion is rotatably provided with respect to the vehicle main body about a vertical axis by means of the connecting shaft.

However, because the connecting shaft penetrates through the power receiving portion when the power receiving portion is provided to the connecting shaft, problems arise because the power receiving portion is provided to the connecting shaft. For example, the connecting shaft cannot have a large diameter or heat is generated because of the sliding motions between the connecting shaft and the power receiving portion.

The present invention was made in light of this point, and its object is to provide an article transport facility in which electric power can be properly supplied from the electricity supply line to the power receiving portion even in a curved portion of a predetermined travel path without providing the power receiving portion to the connecting shaft.

MEANS FOR SOLVING THE PROBLEMS

In order to achieve this object, an article transport facility in accordance with the present invention comprises: a travel rail and an article transport vehicle that includes a power receiving portion to which driving electric power is supplied contactlessly from an electricity supply line provided along the travel rail and that is capable of traveling while being guided by the travel rail.

The travel rail and the electricity supply line extend along a predetermined travel path that is formed by combining straight portions and curved portions, wherein the article transport vehicle includes a vehicle main body, and a travel portion having a guide wheel that contacts and is guided by the travel rail with respect to a horizontal direction and a travel wheel that is driven and rotated and that contacts the travel rail, wherein the travel portion is connected to the vehicle main body by a connecting shaft such that the travel portion is rotatable about a vertical axis with respect to vehicle main body, wherein the power receiving portion is supported by the vehicle main body such that the power receiving portion can be moved in a lateral direction of the article transport vehicle, and wherein the article transport vehicle includes power receiving portion moving means for moving the power receiving portion outwardly of the curved portion in the lateral direction of the article transport vehicle in association with a rotation of the connecting shaft as the travel portion rotates about the vertical axis with respect to the vehicle main body while traveling in the curved portion.

With such a configuration, the power receiving portion is not provided to the connecting shaft which connects the vehicle main body and the travel portion but is provided to and supported by the vehicle main body such that the power receiving portion can be moved in the lateral direction of the article transport vehicle. Therefore, the problems caused by providing the power receiving portion to the connecting shaft, such as the problem that the connecting shaft cannot have a large diameter or that heat is generated due to sliding between the connecting shaft and the power receiving portion, would not arise.

And although the travel portion rotates about a vertical axis with respect to a vehicle main body as it travels along the travel rail in a curved portion, the power receiving portion moving means moves the power receiving portion outwardly of the curved portion in the lateral direction of the article transport vehicle in association with the rotation of the connecting shaft when the travel portion rotates about the vertical axis with respect to the vehicle main body. Thus, although the vehicle main body moves inwardly of the curved portion, the power receiving portion is moved outwardly of the curved portion with respect to the vehicle main body, which can prevent the distance between the electricity supply line provided along the curved portion and the power receiving portion in the lateral direction of the article transport vehicle from increasing. And because the power receiving portion moving means moves the power receiving portion outwardly of the curved portion in the lateral direction of the article transport vehicle in the curved portion, the positional relationship between the electricity supply line and the power receiving portion can be maintained within the proper range in which electricity can be supplied.

Because the amount of the inward movement of the vehicle main body in a curved portion corresponds to the amount of rotation of the connecting shafts, the power receiving portion can be moved by the amount that corresponds to the amount of movement of the vehicle main body inwardly of the curved portion by configuring the power receiving portion moving means to move the power receiving portion in association with the rotation of the connecting shaft. Therefore, by using the rotation of the connecting shaft when moving the power receiving portion in the lateral direction of the article transport vehicle, the amount of movement of the power receiving portion can be easily managed and the positional relationship between the electricity supply line and the power receiving portion can be precisely and reliably maintained within the proper range.

As such, an article transport facility is realized in which electric power can be properly supplied from the electricity supply line to the power receiving portion even in a curved portion of a predetermined travel path without providing the power receiving portion to the connecting shaft.

In an embodiment of the article transport facility in accordance with the present invention, a pair of right and left travel rails are preferably provided as the travel rail with one travel rail provided on one side and the other travel rail provided on the other side in the lateral direction of the article transport vehicle, wherein the travel portion is preferably capable of travelling on the travel rails by means of the travel wheel, wherein the vehicle main body is preferably suspended and supported by the travel portion at a position below the travel rails by means of the connecting shaft, wherein the connecting shaft is preferably located in a center portion of a gap between the pair of right and left travel rails in the lateral direction of the said article transport vehicle, wherein the electricity supply line is preferably located at a position that is displaced from the connecting shaft in the lateral direction of the said article transport vehicle.

With such a configuration, since a pair of right and left travel rails are provided with one travel rail on one side and the other on the other side in the lateral direction of the article transport vehicle, the travel portion can be precisely guided by the pair of right and left travel rails so that the travel portion can travel with high degree of stability. And because the connecting shaft is located in a center portion of a gap between the pair of right and left travel rails in the lateral direction of the said article transport vehicle, the vehicle main body can be suspended and supported with sufficient balance in the lateral direction of the article transport vehicle.

Since the electricity supply line is provided along the travel rails, it is advantageous to provide the power receiving portion in an upper portion of the vehicle main body located below the travel rails, and to have the electricity supply line supported by the travel rails so that the power can be supplied to the power receiving portion. And because the travel portion travels on the travel rails and because the vehicle main body is suspended and supported below the travel rails, the connecting shaft and the electricity supply line end up being located next to each other in the lateral direction of the article transport vehicle. Thus, with such a configuration, because the electricity supply line is provided at a position displaced from the connecting shaft in the lateral direction of the article transport vehicle, the installation space of the electricity supply line is limited to a space that is displaced to one end side from the center portion in the lateral direction of an article transport vehicle and that does not get in the way of the connecting shaft. Since the degree of freedom for the installation space of the electricity supply line is thus limited, for example, the location of the electricity supply line cannot be freely changed to maintain the positional relationship, between the electricity supply line and the power receiving portion in the lateral direction of the article transport vehicle, within a proper range in which electric power can be supplied. To this end, as described above, it is effective to be able to maintain the positional relationship between the electricity supply line and the power receiving portion within the proper range in which electric power can be supplied by virtue of the fact that the power receiving portion moving means moves the power receiving portion outwardly of the curved portion in the lateral direction of the article transport vehicle in the curved portion.

Therefore, the connecting shaft can be located at a position in the lateral direction of the article transport vehicle at which the vehicle main body can be suspended and supported stably and with sufficient balance. And the positional relationship of the electricity supply line and the power receiving portion can be maintained within the proper range in which electric power can be supplied while the electricity supply line can be located in a position that does not get in the way of the connecting shaft.

In an embodiment of the article transport facility in accordance with the present invention, provided as the electricity supply line preferably are a first electricity supply line provided at a position that is displaced to one side from the connecting shaft in the lateral direction of the said article transport vehicle, and a second electricity supply line provided at a position that is displaced to the other side from the connecting shaft in the lateral direction of the said article transport vehicle.

With such a configuration, since two electricity supply lines including the first electricity supply line and the second electricity supply line are provided as the electricity supply line instead of one, driving or actuating electric power can be supplied stably and reliably.

And the range in which the position can be adjusted to the outwardly of the curved portion is small for the electricity supply line, between the first electricity supply line and the second electricity supply line, that is provided at the position outward of the curved portion with respect to the connecting shaft in the curved portion. And so when the vehicle main body in the curved portion moves inwardly of the curved portion, it becomes impossible to maintain the positional relationship between the electricity supply line and the power receiving portion within the proper range in which electric power can be supplied. Thus, even when providing two electricity supply lines including the first electricity supply line and the second electricity supply line, the positional relationship between each of the first electricity supply line and the second electricity supply line and the power receiving portion can be maintained within the proper range in which electric power can be supplied so that driving or actuating electric power can be supplied stably and reliably by allowing the power receiving portion moving means to move the power receiving portion outwardly of the curved portion in the lateral direction of the article transport vehicle in a curved portion.

In an embodiment of the article transport facility in accordance with the present invention, a pair of front and back travel portions are preferably provided as the travel portion such that the travel portions are spaced apart from each other in a fore and aft direction of the article transport vehicle. And each of the front and back travel portions is preferably connected to the vehicle main body by the connecting shaft such that the travel portion is rotatable about the vertical axis with respect to vehicle main body. And the power receiving portion moving means is preferably configured to move the power receiving portion in the lateral direction of the article transport vehicle in association only with the rotation of the connecting shaft that connects one of the pair of front and back travel portions with the vehicle main body.

With such a configuration, because a pair of front and back travel portions are provided as the travel portion such that the travel portions are spaced apart from each other in a fore and aft direction of the article transport vehicle, and because each of the pair of front and back travel portions travels while being independently guided by the travel rail, the travelling in a curved portion can be made more smooth and with greater stability. And a pair of front and back connecting shafts are provided since each of the front and back travel portions is connected to the vehicle main body by the connecting shaft such that the travel portion is rotatable about the vertical axis with respect to vehicle main body. Therefore, although the both of the pair of front and back connecting shafts rotate about vertical axes when traveling in a curved portion, since the power receiving portion moving means moves the power receiving portion in the lateral direction of the article transport vehicle in association only with the rotation of one of the pair of front and back connecting shafts of one side, the power receiving portion can be moved without an interference from the rotation of the other of the pair of front and back connecting shafts so that the power receiving portion can be moved to a proper position where the proper range in which electric power can be supplied can be maintained.

In an embodiment of the article transport facility in accordance with the present invention, the power receiving portion is preferably supported by a guide rail that is provided to the vehicle main body and that extends in the lateral direction of the article transport vehicle such that the power receiving portion can be moved in the lateral direction of the said article transport vehicle. And the power receiving portion moving means preferably includes a pinion portion that can be rotated in unison with the connecting shaft and a rack portion that is formed in the power receiving portion to extend along the lateral direction of the article transport vehicle and that meshes with the pinion portion.

With such a configuration, since the power receiving portion is supported by the guide rail such that it can be moved in the lateral direction of the article transport vehicle, the power receiving portion can be moved smoothly and precisely along the lateral direction of the article transport vehicle. And since the power receiving portion moving means includes the pinion portion that can rotate in unison with the connecting shaft and the rack portion which meshes with the pinion portion, the position of the power receiving portion which has been moved by the meshing between the pinion portion and the rack portion can be maintained, while having a simple configuration for the power receiving portion moving means. Thus, the positional relationship between the electricity supply line and the power receiving portion can be maintained precisely within the proper range in which electric power can be supplied.

In an embodiment of the article transport facility in accordance with the present invention, preferably provided at an intermediate location in the predetermined travel path is at least one of: a converging portion in which a plurality of travel paths, including at least a travel path of the curved portion, merge; and a diverging portion in which a travel path diverges to a plurality of travel paths that include at least a travel path of the curved portion. And the travel rail is provided only on one side in the lateral direction of the article transport vehicle in the converging portion and in the diverging portion and a pair of right and left travel rails are provided with one travel rail provided on one side and the other travel rail provided on the other side in the lateral direction of the article transport vehicle in portions other than the converging portion and the diverging portion. And preferably provided in the converging portion and in the diverging portion is a converging and diverging travel rail that contacts and guides a guided wheel provided to the travel portion to allow the travel portion to perform a converging travel and to allow the travel portion to perform a diverging travel.

With such a configuration, since the travel rail is provided only on one side in the lateral direction of the article transport vehicle in the converging portion and in the diverging portion, a space can be provided through which the article transport vehicle can pass on the other side in the lateral direction of the article transport vehicle. Thus, converging travel and diverging travel can be performed without the travel rail getting in the way. However, since only the travel rail on one side in the lateral direction of the article transport vehicle guides the traveling of the travel portion in the converging portion and in the diverging portion, traveling of the travel portion may become unstable. With the characteristic configuration, since the converging and diverging travel rail is provided in the converging portion and in the diverging portion and since the travel portion can travel while being guided by this converging and diverging travel rail, travel portion can travel while being guided by the converging and diverging travel rail and by the travel rail on one side in the lateral direction of the article transport vehicle so that the article transport vehicle can perform converging travel and diverging travel. And since the travel portion travels while being guided by the converging and diverging travel rail and by the travel rail on one side in the lateral direction of the article transport vehicle the travel portion can be prevented from inadvertently rotating about the vertical axis with respect to the vehicle main body during a converging travel and a diverging travel. Thus, the power receiving portion can be reliably prevented from moving away from the proper position as the result of the power receiving portion being moved in the lateral direction of the article transport vehicle by the inadvertent rotation of the travel portion.

Therefore, it is possible to precisely perform a converging travel and a diverging travel while maintaining the positional relationship between the electricity supply line and the power receiving portion within the proper range in which electric power can be supplied so that electricity can be properly supplied from the electricity supply line to the power receiving portion even in a predetermined travel path that has a converging portion and a diverging portion.

DETAILED DESCRIPTION OF THE INVENTION

An embodiment of the article transport facility in accordance with the present invention is described with reference to the drawings.

Figure 1:
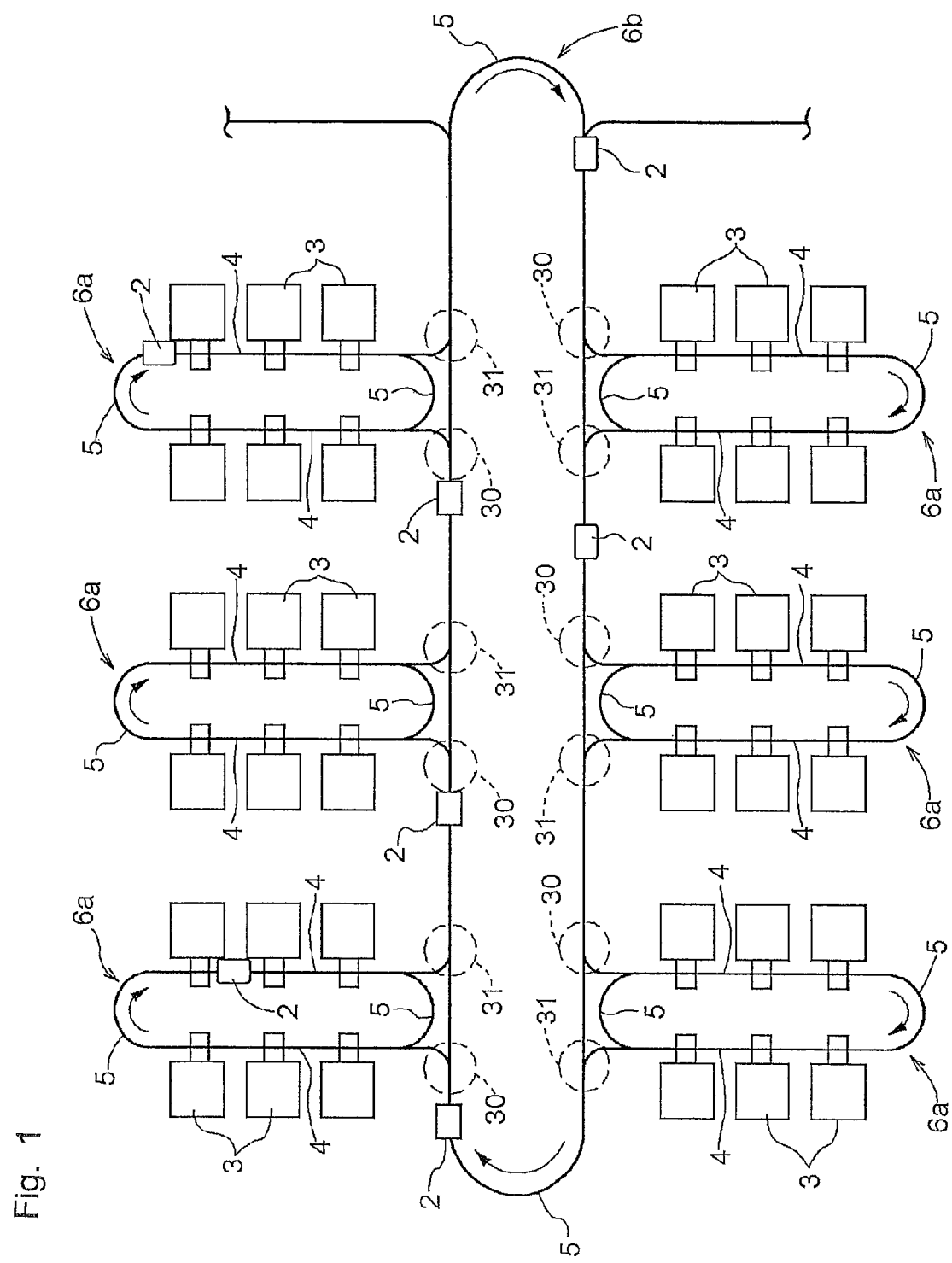
FIG. 1 is a schematic diagram showing a predetermined travel path in an article transport facility.

As shown in FIG. 1, this article transport facility includes a plurality of article transport vehicles 2 that travel in fixed directions (directions shown by arrows in the drawing) and along predetermined travel paths that are defined by combining straight portions 4 which are straight travel paths and curved portions 5 which are arc-shaped travel paths. And, the predetermined travel paths are arranged to extend along or by way of a plurality of article processors 3, and the article transport vehicles 2 are configured to transport articles 7 among the plurality of article processors 3. Provided as predetermined travel paths shown in FIG. 1 are a plurality of loop-shaped secondary travel paths 6a which extend along or by way of the plurality of article processors 3, and a loop-shaped primary travel path 6b which is connected with each of the plurality of the secondary travel path 6a. And the predetermined travel paths are configured to allow the article transport vehicles 2 to travel to move away, or diverge, from the primary travel path 6b and into a secondary travel path 6a at a diverging portion 30 and such as to merge or converge from a secondary travel path 6a into the primary travel path 6b at converging portions 31.

Figure 2:
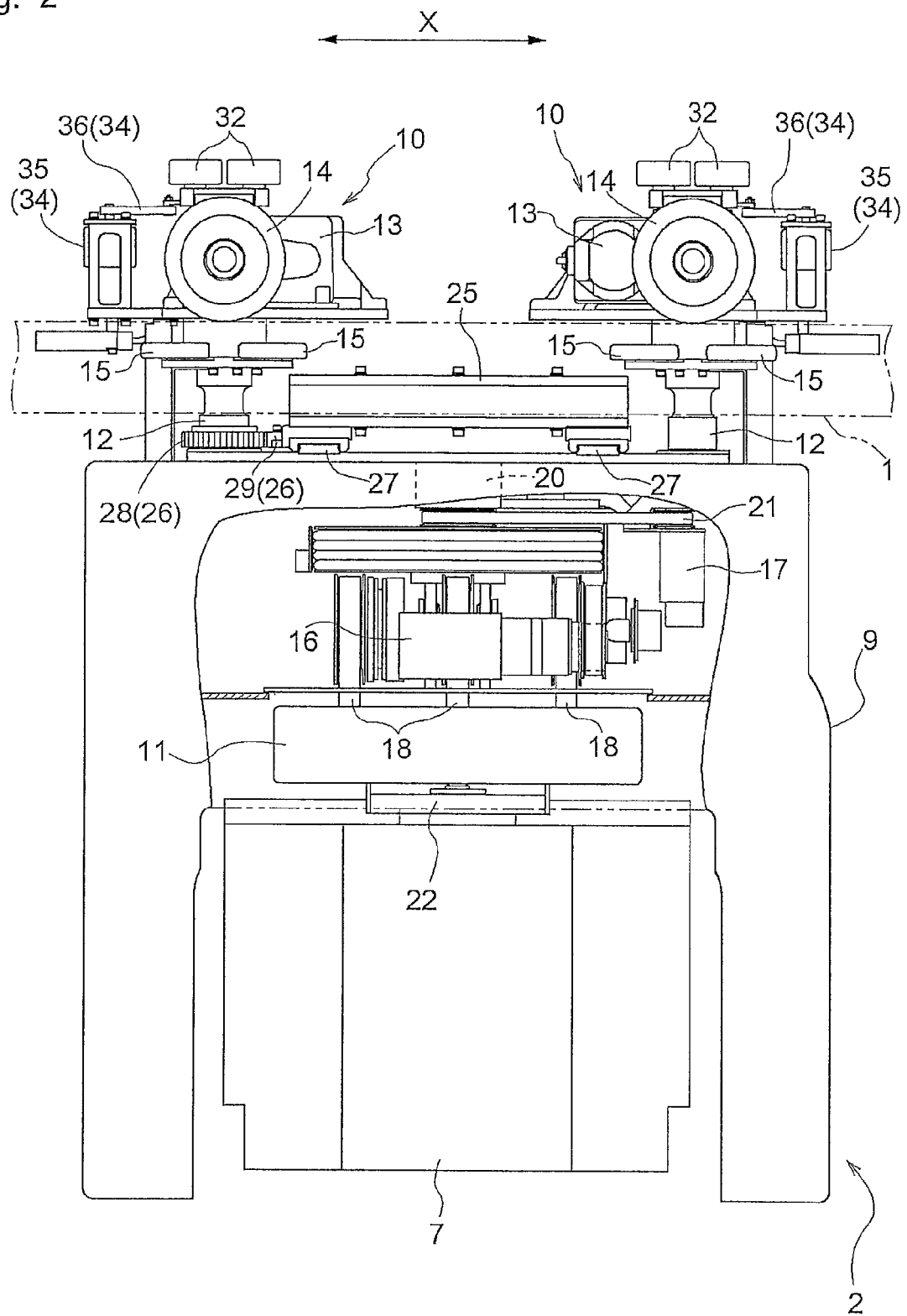
FIG. 2 is a side view of an article transport vehicle.
Figure 3:
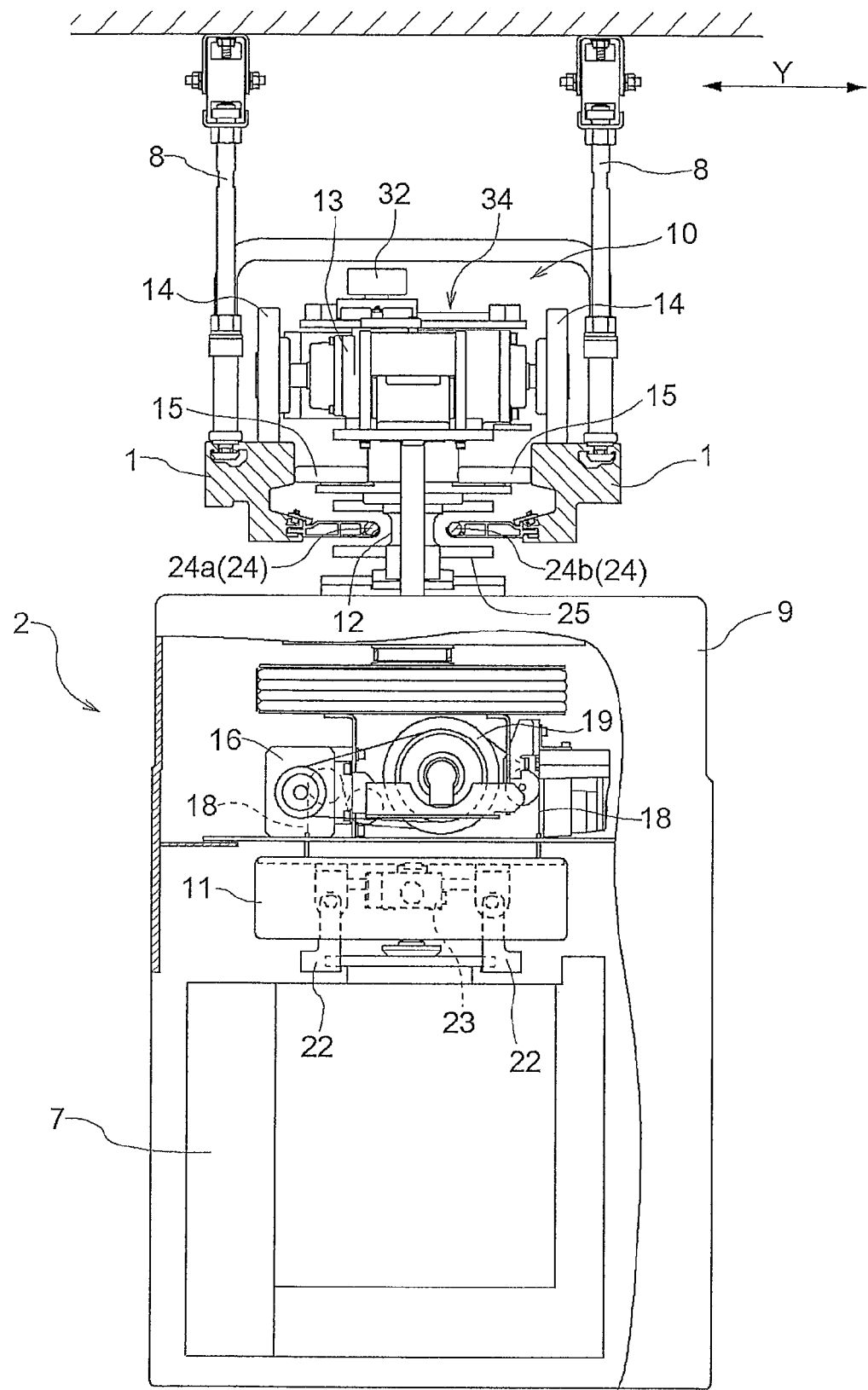
FIG. 3 is a front view of the article transport vehicle.
Figure 4:
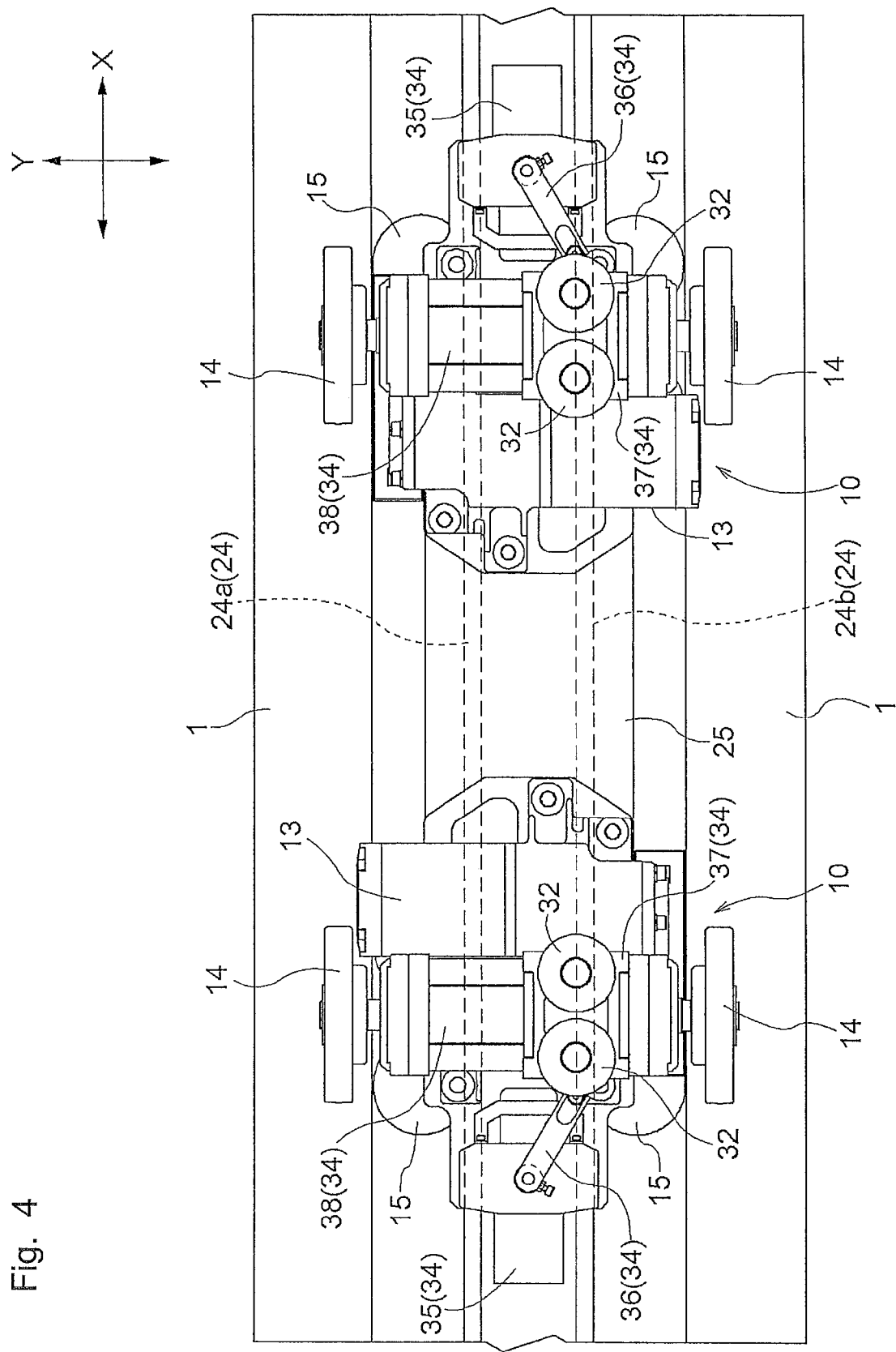
FIG. 4 is a plan view of the article transport vehicle.

As shown in FIGS. 2-4, travel rails 1 are provided to the ceiling side and are arranged such that the travel rails 1 extend along the predetermined travel paths over the entire lengths of the primary travel path 6b and the plurality of secondary travel paths 6a as the predetermined travel paths. The travel rails 1 are fixedly installed to the ceiling portion by means of travel rail brackets 8. And a pair of right and left travel rails 1, one on one side and one on the other side of the article transport vehicle 2 in the lateral direction (direction Y in the figures) are provided. FIG. 2 is a side view of the article transport vehicle 2 as seen along a lateral direction (direction Y in the figures) of the vehicle 2. FIG. 3 is a front view of the article transport vehicle 2 as seen along a fore and aft direction (direction X in the figures) of the vehicle 2. FIG. 4 is a plan view of the article transport vehicle 2 as seen from above the travel rails 1.

As shown in FIGS. 2-4, the article transport vehicle 2 includes a vehicle main body 9, a travel portion 10 which travels on the travel rails 1, and a grip portion 11 which grips an article 7 with the article 7 being suspended therefrom. A pair of front and back travel portions 10 are provided such that they are spaced apart from each other in the fore and aft direction of the article transport vehicle 2 and such that they are located at a location that corresponds to a forward end portion of the vehicle main body 9 and at a location that corresponds to a back end portion respectively. Each of the pair of front and back travel portions 10 is connected to the vehicle main body 9 by means of a connecting shaft 12 to be rotatable about a vertical axis with respect to the vehicle main body 9. The grip portion 11 is provided to the vehicle main body 9 such that it can be moved vertically or raised and lowered.

Provided to each of the pair of front and back travel portions 10 are travel wheels 14 that are driven and rotated by an electric drive motor 13 and that roll on respective horizontally extending top surfaces of the pair of right and left travel rails 1, and guide wheels 15 that contact respective vertically extending side faces, of the pair of right and left travel rails 1, which face each other and that are freely rotatable. One travel wheel 14 is provided to each of the lateral ends (direction of Y in the figures) of the article transport vehicle 2. In addition, two guide wheels 15 are provided on each of the lateral ends of the article transport vehicle 2 such that the two guide wheels 15 are spaced apart from each other in the fore and aft direction of the article transport vehicle 2. And the travel portion 10 is configured to travel while it is guided by the travel rails 1 by virtue of the fact that the travel wheels 14 are driven and rotated about horizontal axes by the drive motor 13, and the fact that the guide wheels 15 which can rotate freely about vertical axes are guided in the horizontal direction through contact with the pair of travel rails 1.

Each of the pair of front and back travel portions 10 is connected to the vehicle main body 9 by the connecting shaft 12 such that it can rotate about a vertical axis with respect to the vehicle main body 9. The connecting shafts 12 are located in the center section of the gap between the pair of right and left travel rails 1 in the lateral direction of the article transport vehicle 2 to connect the center section of the vehicle main body 9 and the center section of the travel portion 10 to each other in the lateral direction of the article transport vehicle 2. This allows the travel portions 10 to travel along the travel rails 1 by rotating about vertical axes with respect to the vehicle main body 9 by means of the connecting shafts 12 even in a travel path that is an arc-shaped curved portion 5 (see FIG. 1) in the predetermined travel paths. As a result, the article transport vehicle 2 is configured to be able to travel smoothly not only in a straight portion 4 but also in a curved portion 5.

The vehicle main body 9 is formed to have a bracket shape that opens downwardly with its forward end and back end (in the fore and aft direction of the article transport vehicle 2) extending downwardly and with the grip portion 11 located between the forward end and the back end that extend downwardly. And provided to the vehicle main body 9 are an electric vertical movement motor 16 for vertically moving the grip portion 11 and an electric turning motor 17 for rotating the grip portion 11 about a vertical axis.

The vertical movement motor 16 is configured to vertically move or raise and lower the grip portion 11 between a raised position and a lowered position by driving and rotating a rotating drum 19 to which belts 18 are spooled (this does not have to be belts and timing belts or wires may be used instead) to spool and feed out the belts 18. Here, the raised position is a position close to or in the vicinity of the vehicle main body 9, as shown in FIG. 2 and FIG. 3, and the lowered position, while not shown, is a position for transferring articles to or from the article transfer station that corresponds to each of the article processors 3 installed on the floor side. The station consists of a supporting platforms for receiving and supporting an article 7 and is provided to receive from the article transport vehicles 2 articles 7 on which predetermined processing is performed by the article processor 3 or to deliver to the article transport vehicles 2 articles 7 on which predetermined processing have been performed by the article processor 3.

The grip portion 11 is connected to the vehicle main body 9 such that it can be rotated with respect to the vehicle main body 9 about a vertical axis by means of a rotation shaft 20 extending downwardly from the upper end portion of the vehicle main body 9. And the turning motor 17 is configured to be able to rotate the grip portion 11 about the vertical axis by actuating and rotating the rotation shaft 20 about a vertical axis through a rotation power transfer portion 21 which includes a pair of pulleys and a belt. It is also possible to use other assembly that belongs to conventional technology as the rotation power transfer portion 21 such as a structure which consists of a plurality of gears which engage each other.

The grip portion 11 includes a gripper 22 for gripping an article 7, and an electric gripper motor 23 for performing attitude switch over operations of the gripper 22 between a gripping attitude for gripping the article 7 and a grip release attitude for releasing the grip. FIG. 3 shows the state where the gripper 22 is switched to the gripping attitude.

Provided to the article transport vehicle 2 is a vehicle side controller for controlling, among other things, traveling operation of the travel portion 10, vertical movement operation of the grip portion 11, and attitude switching operation of the gripper 22 to control operation of the article transport vehicle 2. And when the vehicle side controller receives a transport command which specifies the station of transport origin and the station of transport destination from the facility management computer which manages operations of the plurality of article transport vehicles 2, the vehicle side controller is configured to perform a transport process for transporting an article 7 from the station of transport origin to the station of transport destination specified in the transport command. More specifically, the vehicle side controller controls operation of the article transport vehicle 2 to receive the article 7 from the station of transport origin by controlling the vertical movement operation of the grip portion 11 and the attitude switching operation of the gripper 22 after controlling the traveling operation of the travel portion 10 to travel to the specified station of transport origin based on the detected information from various sensors, such as a sensor for detecting a target stopping position corresponding to each station and a sensor for detecting the distance travelled by the article transport vehicle 2 from a reference point, etc. Thereafter, the vehicle side controller controls the travelling of the article transport vehicle 2 to travel to the specified station of transport origin based on the detected information from various sensors and controls operation of the article transport vehicle 2 to unload the article 7 to the station of transport destination.

Thus, electric power needs to be supplied to the article transport vehicle 2 for operation in order for the article transport vehicle 2 to perform a transport process. To this end, electricity supply lines 24 for supplying driving electric power to the article transport vehicle 2 are provided such that they extend along the predetermined travel paths over the entire length of the primary travel paths 6b and the plurality of secondary travel paths 6a of the predetermined travel paths, similarly to the pair of right and left travel rails 1. And as shown in FIGS. 3 and 4, provided as the electricity supply line 24 are a first electricity supply line 24a provided at a position displaced to one side in the lateral direction (direction Y in the figures) of the article transport vehicle 2, from the connecting shaft 12 which connects the vehicle main body 9 and the travel portion 10 and a second electricity supply line 24b provided at a position displaced to the other side in the lateral direction (direction Y in the figures) of the article transport vehicle 2 from the connecting shaft 12. Each of the first electricity supply line 24a and the second electricity supply line 24b is fixed to and supported by respective one of the pair of right and left travel rails 1 and extends along the travels rail 1.

Figure 5:
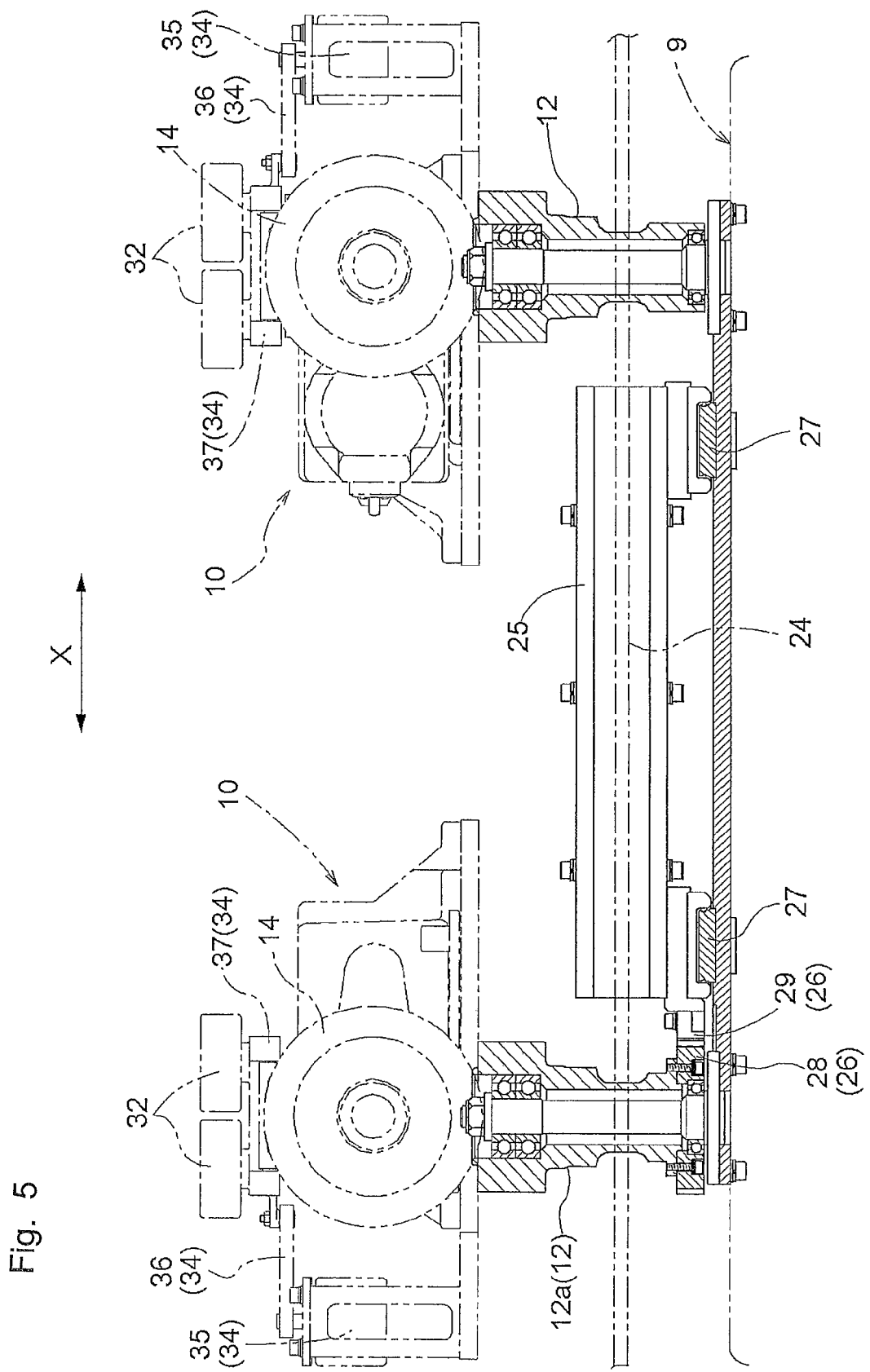
FIG. 5 shows a magnified view of a principal part of what is shown in FIG. 2.

On the other hand, as shown in FIG. 2 and FIG. 5 in which the principal part of FIG. 2 is expanded, a single power receiving portion 25 (power receiving coil) to which driving electric power is supplied from the electricity supply line 24 contactlessly or without contact is provided to the vehicle main body 9 of the article transport vehicle 2. The power receiving portion 25 is located in the center section of the vehicle main body 9 between the pair of front and back connecting shafts 12 in the fore and aft direction (direction X in the figures) of the article transport vehicle 2 and is formed to have a rectangular shape. In addition, as shown in FIG. 3, the power receiving portion 25 is located in the center section of the vehicle main body 9 in the lateral direction (direction Y in the figures) of the article transport vehicle 2 and is formed such that its cross section, as seen along the fore and aft direction of the article transport vehicle 2, has a shaped of an H that is rotated by 90 degrees (a shape having an upper portion that extends horizontally in the lateral direction, a lower portion that extends horizontally in the lateral direction, and an intermediate portion that extends vertically between the upper portion and the lower portion). And magnetic field is generated by applying alternating currents in the electricity supply lines 24, which magnetic field generates driving electric power in the power receiving portion 25 so that electric power is supplied contactlessly or without contact. Thus, the article transport vehicle 2 is configured to cause the travel portion 10 to travel and the grip portion 11 to be moved vertically, etc. with the driving electric power supplied from the electricity supply lines 24 to the power receiving portion 25 contactlessly.

Figure 6:
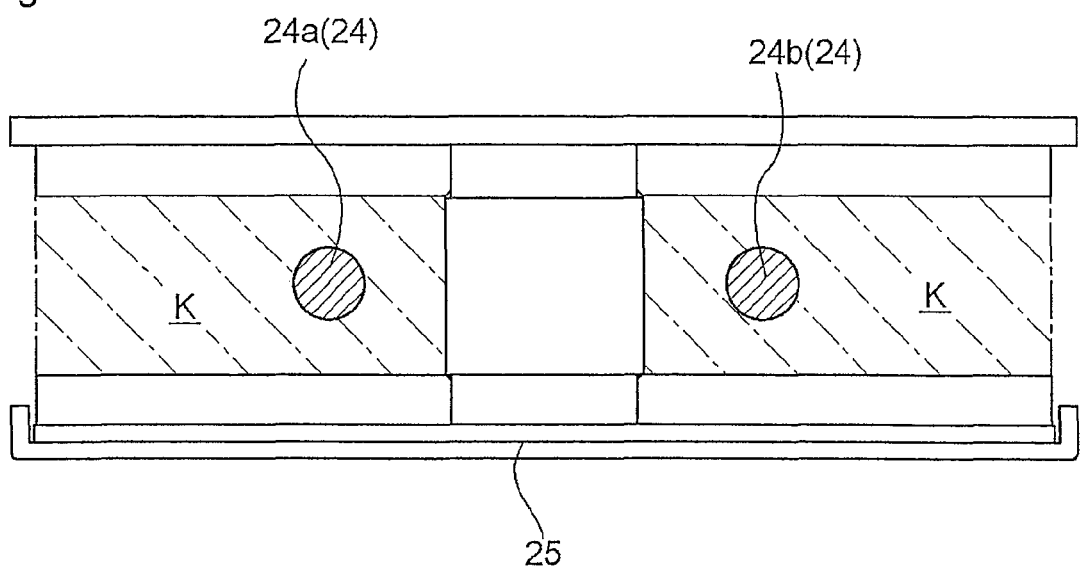
FIG. 6 shows the positional relationship between the electricity supply line and the power receiving portion.

Since driving electric power is supplied from the electricity supply line 24 to the power receiving portion 25 contactlessly as described above, it is necessary to maintain the positional relationship, between the electricity supply line 24 and the power receiving portion 25 in the lateral direction of the article transport vehicle, within a proper range in which electric power can be supplied over the entire length of the predetermined travel paths formed by combining the straight portions 4 and the curved portions 5, in order to properly supply electric power from the electricity supply line 24 to the power receiving portion 25. More specifically, as shown in FIG. 6, it is necessary to maintain the positional relationship between the electricity supply line 24 and the power receiving portion 25 within the proper range in which electricity supply lines 24 are located within the electricity suppliable region K (shaded region in the figure, i.e., region that is bound by the upper portion and the lower portion of the power receiving portion 25 having a shape of an H that is rotated by 90 degrees) of the power receiving portion 25 over the entire length of the predetermined travel paths formed by combining the straight portions 4 and the curved portions 5.

Figure 7:
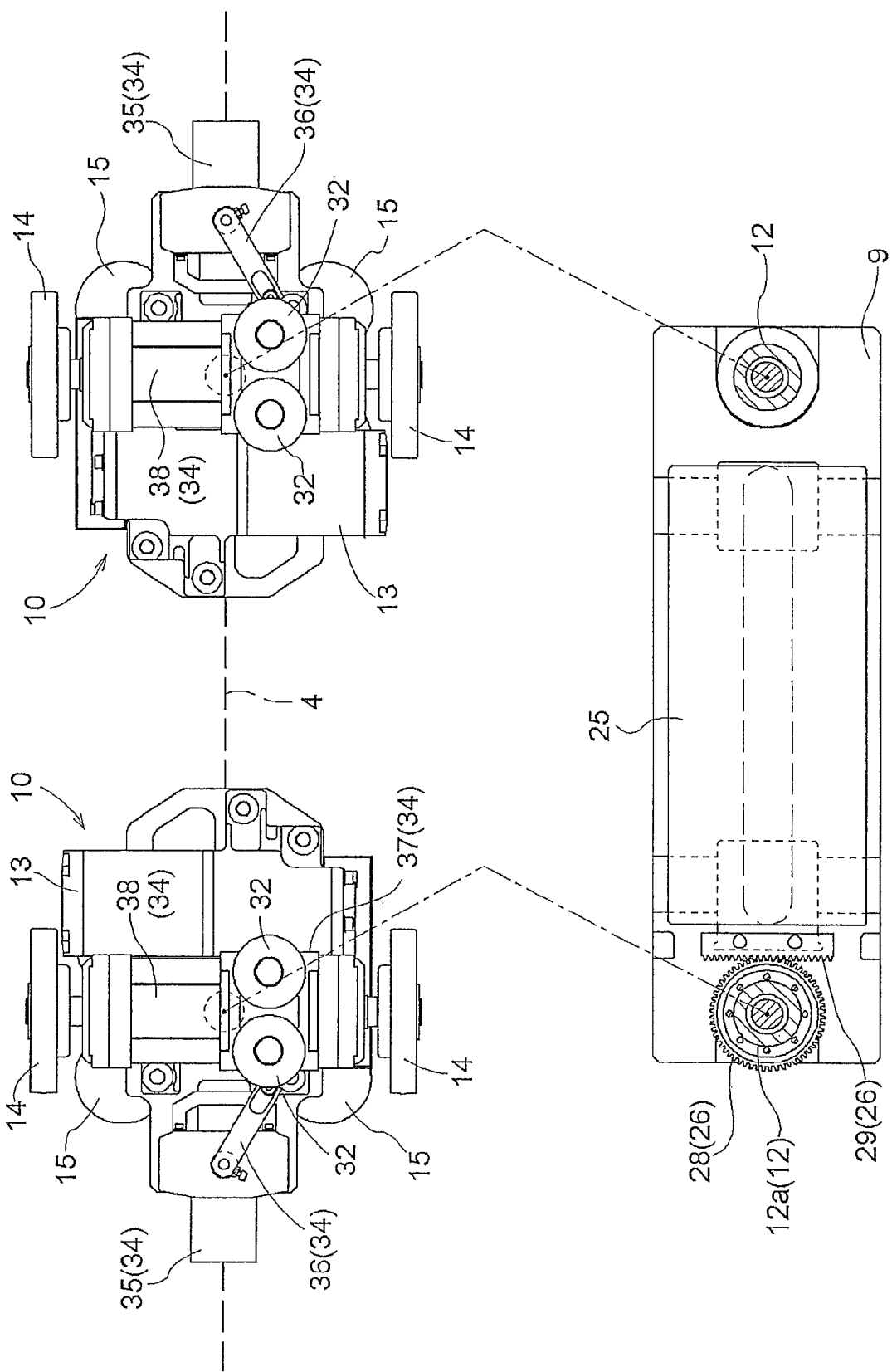
FIG. 7 is a plan view showing the relationship between the travel portion and the power receiving portion when the article transport vehicle is traveling in a straight portion.
Figure 8:
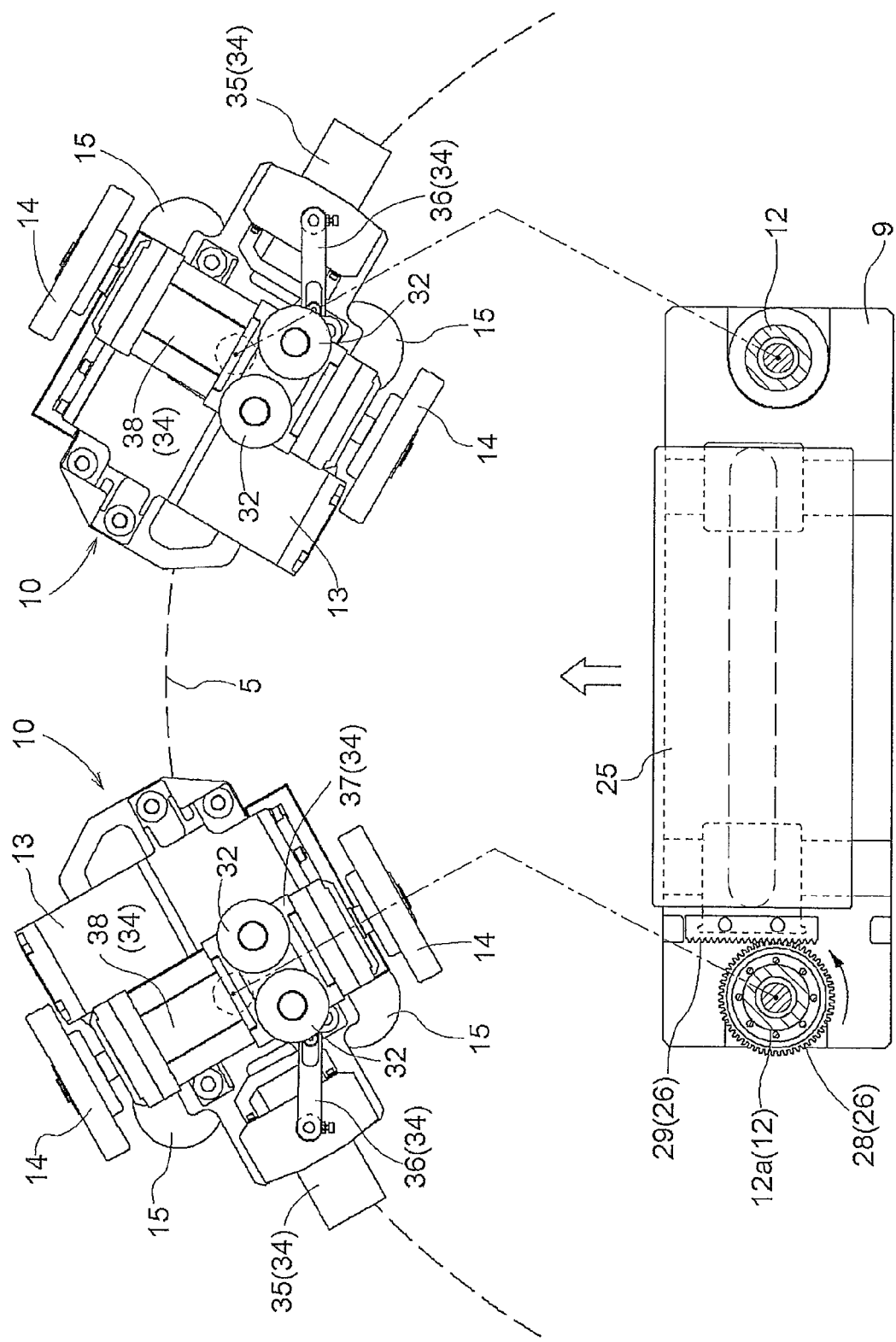
FIG. 8 is a plan view showing the relationship between the travel portion and the power receiving portion when the article transport vehicle is traveling in a curved portion.

To this end, as shown in FIGS. 5, 7, and 8, in order to properly supply electricity from the electricity supply line 24 to the power receiving portion 25 in the article transport facility in accordance with the present invention, the power receiving portion 25 is supported by the vehicle main body 9, such that the power receiving portion 25 can move freely in the lateral direction of the article transport vehicle 2: and the article transport vehicle 2 is provided with power receiving portion moving means 26 for moving the power receiving portion 25 outwardly of the curved portion 5 in the lateral direction of the article transport vehicle 2 in association with the rotation of the connecting shaft 12 when the travel portion 10 rotate about a vertical axis with respect to the vehicle main body 9 while traveling in a curved portion 5. FIGS. 7 and 8 show the relationship between the travel portions 10, the power receiving portion 25, and the vehicle main body 9 with FIG. 7 showing when traveling in a straight portion 4 and FIG. 8 showing when traveling in a curved portion 5.

As shown in FIGS. 3 and 5, the power receiving portion 25 is provided such that it projects upwardly from the top surface of the vehicle main body 9 and such that it can slide along guide rails 27 extending in the lateral direction of the article transport vehicle 2. The guide rails comprise a pair of front and back guide rails 27 that are spaced apart from each other in the fore and aft direction of the article transport vehicle 2. Each of the pair of front and back guide rails 27 supports respective one of the ends of the power receiving portion 25 in the fore and aft direction such that the power receiving portion 25 can slide freely in the lateral direction of the article transport vehicle 2. This allows the power receiving portion 25 to be moved smoothly in the lateral direction of the article transport vehicle 2 with respect to the vehicle main body 9.

As described above, the article transport vehicle 2 travels along the travel rails 1 by virtue of the fact that the travel portions 10 rotate about vertical axes with respect to the vehicle main body 9 by means of the connecting shafts 12 when the article transport vehicle 2 travels in a curved portion 5. And the power receiving portion moving means 26 moves the power receiving portion 25 outwardly of the curved portion 5 in the lateral direction of the article transport vehicle 2 (or direction away from the center of curvature of the curved portion along the radial direction: see the arrow in FIG. 8) in association with the rotation of the connecting shaft 12 during this time. And although a pair of front and back connecting shafts 12 are provided, the power receiving portion moving means 26 is configured to move the power receiving portion 25 in the lateral direction of the article transport vehicle 2 in association only with the rotation of the connecting shaft 12 that connects the vehicle main body 9 with one of the pair of front and back travel portions 10. That is, the power receiving portion moving means 26, shown in FIGS. 5, 7, and 8, moves the power receiving portion 25 in the lateral direction of the article transport vehicle 2 in association with the rotation of one of the connecting shaft 12 between the pair of front and back connecting shaft 12.

The power receiving portion moving means 26 includes a pinion portion 28 which can rotate in unison with the connecting shaft 12, and a rack portion 29 which is formed in the power receiving portion 25 to extend along the lateral direction of the article transport vehicle 2 and which meshes with the pinion portion 28. Thereby, as the connecting shaft 12 rotates, the pinion portion 28 rotates in unison with this rotation. And the pinion portion 28 meshes with the rack portion 29 to move the power receiving portion 25 outwardly of the curved portion 5 in the lateral direction of the article transport vehicle 2 (toward left in FIG. 8: see the arrow in FIG. 8).

Additional explanation is now provided about the positional relationship between the electricity supply line 24 and the power receiving portion 25 in the lateral direction of the article transport vehicle.

The relationship when the article transport vehicle 2 travels in the straight portion 4 is described first.

As shown in FIG. 7, since the travel rails 1 are also arranged or installed along the straight portion 4 in the straight portion 4 (straight travel path shown with broken lines in the figure), the travel portions 10 travel without rotating about vertical axes with respect to the vehicle main body 9. Thus, the trajectories of the travel portions 10 and the trajectory of the vehicle main body 9 become the same trajectory that extends along the straight portion 4. And the power receiving portion 25 provided in the vehicle main body 9 also has the trajectory as the trajectory of the travel portion 10 that extends along the straight portion 4. Therefore, the trajectory of the vehicle main body 9 (power receiving portion 25) extends along the straight portion 4. And the first electricity supply line 24a and the second electricity supply line 24b can be located in the electricity suppliable region K of the power receiving portion 25 (shaded region in the figure) as shown in FIG. 6 so that electricity can be supplied properly from the electricity supply line 24 to the power receiving portion 25.

The positional relationship when the article transport vehicle 2 travels in the straight portion 4 is described next.

Figure 9:
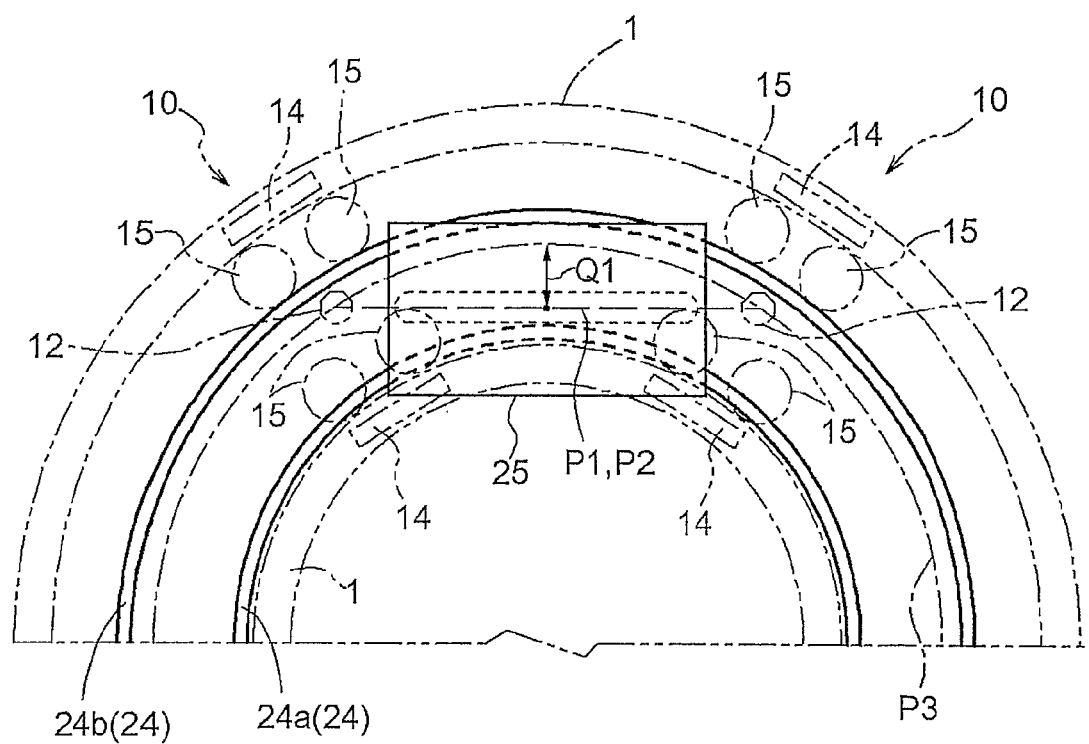
FIGS. 9(a)-(b) show a state of the article transport vehicle of conventional technology as it travels in a curved portion.
Figure 9:
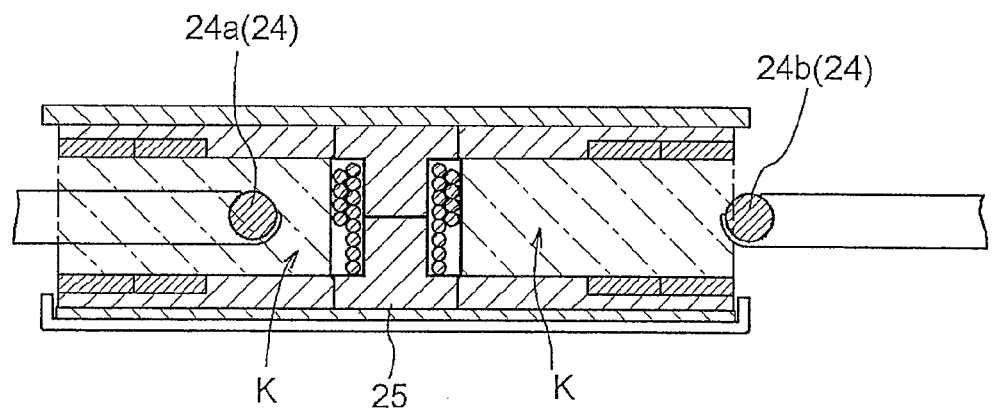

As shown in FIG. 9 (a), the travel portions 10 travel as they rotate about vertical axes with respect to the vehicle main body 9 in an arc-shaped curved portion 5 because the travel rails 1 are arranged to extend along the curved portion 5. Thus, although the trajectories of the travel portions 10 extend along the curved portion 5, the trajectories of the vehicle main body 9 and the power receiving portion 25 do not extend along the curved portion 5, and instead, are displaced inwardly of the curved portion 5. More specifically, while the straight line P1 that extends along the fore and aft direction of the article transport vehicle 2 and that goes through the center of the power receiving portion 25 coincides with the straight line P2 that connects the connecting shafts 12 of the pair of front and back travel portions 10, the straight line P1 would be at a position that is displaced inwardly of the curved portion 5. Therefore, the distance Q1 between the arc-shaped curve P3 (which corresponds to the trajectory of the connecting shafts 12) formed by connecting the center portion of the gap between the pair of right and left travel rails 1 along the curved portion 5 and the straight line P1 becomes larger. And the second electricity supply line 24b, which is the one located outwardly of the curved portion 5 between the first electricity supply line 24a and the second electricity supply line 24b, moves out of, and outwardly from, the power receiving portion 25 in the lateral direction of the article transport vehicle 2. As the result, as shown in FIG. 9 (b), the second electricity supply line 24b is moved out of, and outwardly from, the electricity suppliable region K of the power receiving portion 25 so that electricity may not be supplied properly from the electricity supply line 24 to the power receiving portion 25.

Figure 10:
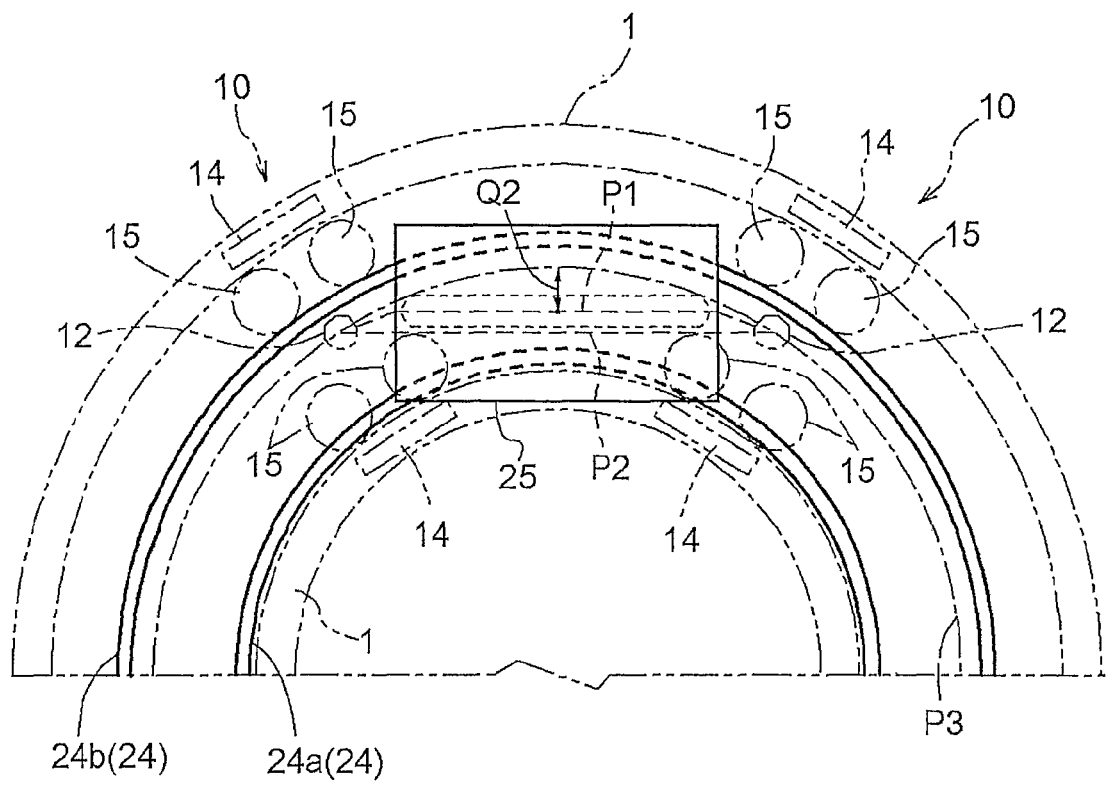
FIGS. 10(a)-(b) show the state of the article transport vehicle in the present invention as it travels in a curved portion.
Figure 10:
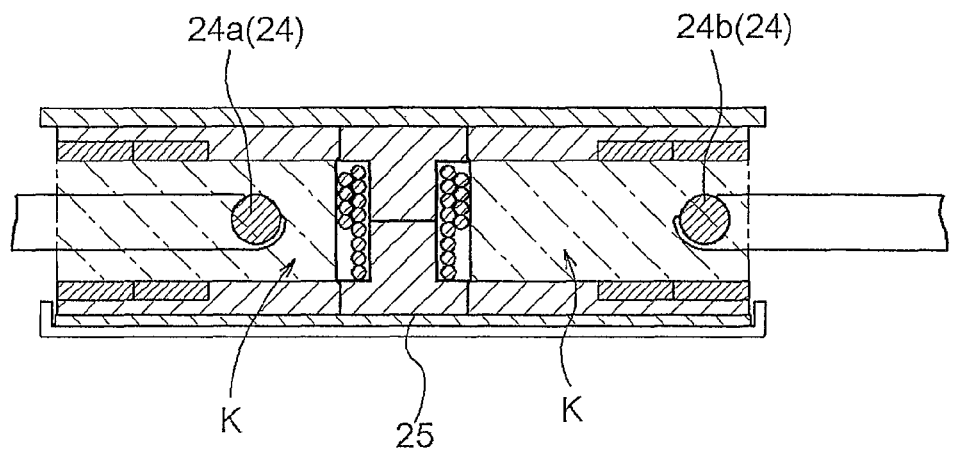

To this end, as described above, in the article transport facility in accordance with the present invention, by providing the power receiving portion moving means 26, as shown in FIG. 8, when the travel portions 10 rotate about vertical axes with respect to the vehicle main body 9, the pinion portion 28 meshes with the rack portion 29 and rotates with the rotation of the connecting shafts 12 during this time and the power receiving portion 25 is moved outwardly (toward left in FIG. 8: see the arrow in FIG. 8) of the curved portion 5 in the lateral direction of the article transport vehicle 2. Thereby, as shown in FIG. 10 (a), the straight line P1 that extends along the fore and aft direction of the article transport vehicle 2 and that goes through the center of the power receiving portion 25 moves outwardly of the straight line P2 that connects the connecting shafts 12 of the pair of front and back travel portions 10 so that the distance Q2 between the curve P3 and the straight line P1 becomes smaller than the distance Q1 shown in FIG. 9 as described above. Therefore, the second electricity supply line 24b can be prevented from moving out of, and outwardly from, the power receiving portion 25 in the lateral direction of the article transport vehicle 2. As the result, as shown in FIG. 10 (b), the first electricity supply line 24a and the second electricity supply line 24b can be maintained within the electricity suppliable region K of the power receiving portion 25 so that the electricity can be properly supplied from the electricity supply line 24 to the power receiving portion 25. Because the amount of the inward movement of the vehicle main body 9 in a curved portion 5 corresponds to the amount of rotation of the connecting shafts 12, the power receiving portion 25 can be moved by the amount that corresponds to the amount of movement of the vehicle main body 9 inwardly of the curved portion 5 because the power receiving portion moving means 26 moves the power receiving portion 25 in association with the rotation of the connecting shaft 12. Therefore, by using the rotation of the connecting shaft 12 when moving the power receiving portion 25 in the lateral direction of the article transport vehicle 2, the amount of movement of the power receiving portion 25 can be easily managed and the positional relationship between the electricity supply line 24 and the power receiving portion 25 can be precisely and reliably maintained within the proper range.

Figure 11:
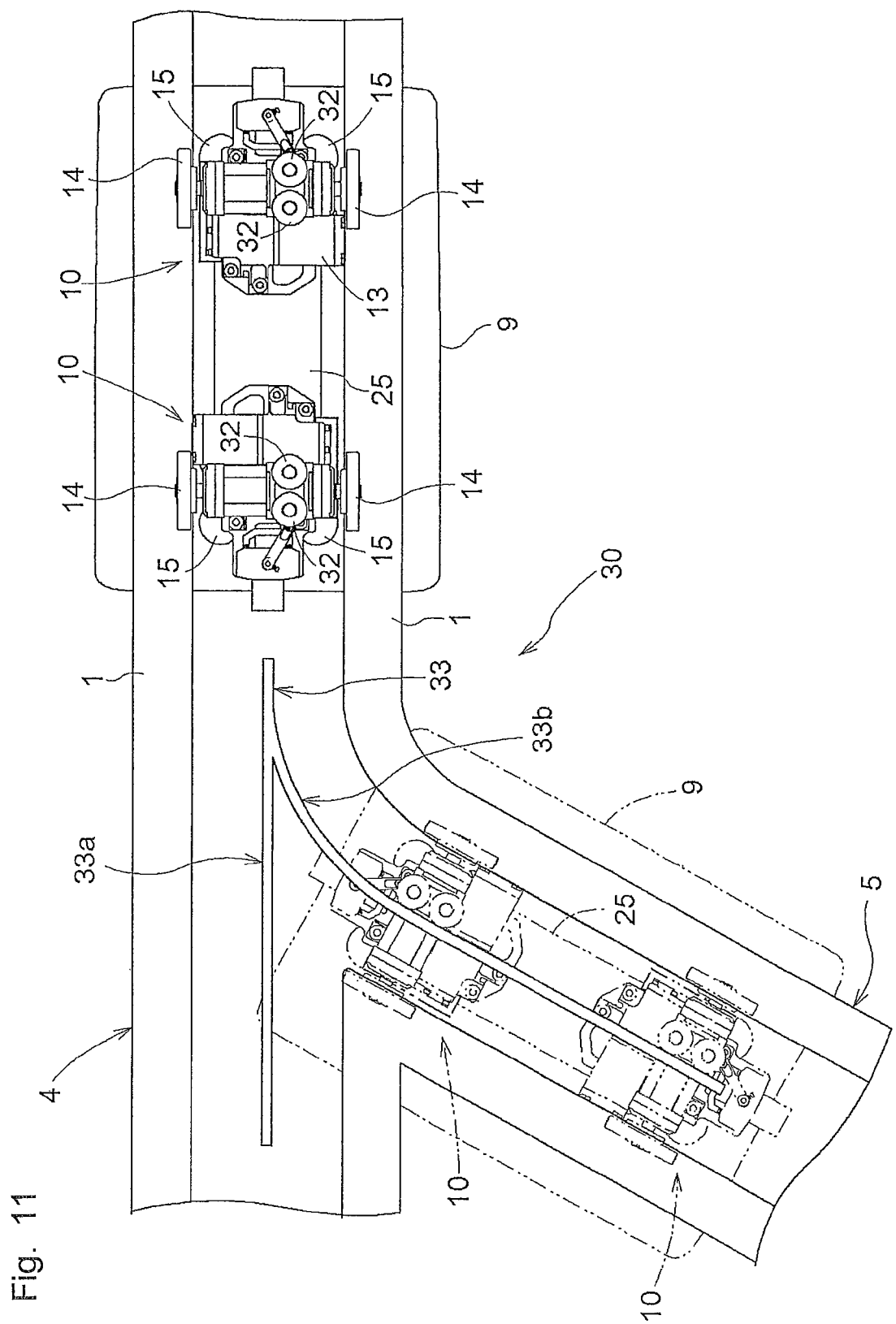
FIG. 11 is a plan view showing the state in a branch portion.

As shown in FIG. 1, provided at intermediate location in the predetermined travel paths are diverging portions 30 at which a travel path splits into a travel path that is a straight portion 4 and a travel path that is a curved portion 5, and converging portions 31 at which a travel path that is a straight portion 4 and a travel path that is a curved portion 5 join or merge. As shown in FIG. 11, at the diverging portions 30 and at the converging portions 31, the travel rails 1 are provided only on one side in the lateral direction of the article transport vehicle 2, and converging and diverging travel rails 33 are provided for facilitating diverging travel at diverging portions 30 and for facilitating converging travel at converging portions 31 by contacting and guiding the guide wheels 32 provided to the travel portions 10. A diverging portion 30 is shown in FIG. 11 and the converging portion 31 is not shown.

To describe in more detail, the converging and diverging travel rails 33 are provided to guide guided wheels 32 that can rotate freely about vertical axes provided in upper portions of the travel portions 10 since the travel rail 1 is provided only on one side in the lateral direction of the article transport vehicle 2 at diverging portions 30. The converging and diverging travel rail 33 includes, as guide surfaces for guiding the guided wheels 32, two guide surfaces having a surface that faces one direction along the lateral direction of the article transport vehicle 2 and a surface that faces the other direction along the lateral direction with the two guide surfaces facing opposite directions from each other. And one of the two guide surfaces of the converging and diverging travel rail 33 is a first guide surface 33a for guiding into the travel path of a straight portion 4 whereas the other of the two guide surfaces is a second guide surface 33b for guiding into the travel path of a curved portion 5.

On the other hand, each of the pair of front and back travel portions 10 of the article transport vehicle 2 includes guide surface switching means 34 that can switch the guide surface that guides the guided wheels 32 between the first guide surface 33a and the second guide surface 33b by changing the position of the guided wheels 32 in the lateral direction of the article transport vehicle 2 with respect to the converging and diverging travel rail 33. One pair of guided wheels 32 are provided such that they are arranged next to each other in the fore and aft direction of the article transport vehicle 2. The guide surface switching means 34 includes a pivot arm 36 which can be pivoted about a vertical axis by an actuator 35 such as a motor, a movable body 37 provided in the distal end portion of the pivot arm 36, and a movement guide 38 for guiding the movement of the movable body 37 in the lateral direction of the article transport vehicle 2. And the guided wheels 32 are supported at distal end portions of the movable body 37 such that the wheels 32 are rotatable about vertical axes. The guide surface switching means 34 is configured to be able to switch between guiding the guided wheels 32 with the first guide surface 33a and guiding the guided wheels 32 with the second guide surface 33b in the converging and diverging travel rail 33 by pivoting the pivot arm 36 with the actuator 35 to change the position of the guided wheels 32 either to the left hand side or to the right hand side in the lateral direction of the article transport vehicle 2. FIG. 11 shows when the guide surface switching means 34 switched to the state in which the guided wheels 32 are guided by the second guide surface 33b in the converging and diverging travel rail 33.

In addition, while not shown but similar to the diverging portion 30 described above, the travel rail 1 is provided only on one side in the lateral direction of the article transport vehicle 2 and converging and diverging travel rails for guiding the guided wheels 32 are provided at the converging portions 31. And the guide surface switching means 34 is configured to cause an article transport vehicle 2 to perform a converging travel by changing the position of the guided wheels 32 to the left hand side or to the right hand side in the lateral direction of the article transport vehicle 2 to guide the guided wheels 32 by means of the converging and diverging travel rail so that the guided wheels 32 are guided by the converging and diverging travel rail.

As such, since the travel rail 1 is provided only on one side in the lateral direction of the article transport vehicle 2 at the diverging portions 30 and the converging portions 31, it is possible for the travel portions 10 to rotate inadvertently about vertical axes with respect to the vehicle main body 9. And if and when this inadvertent rotation happens, the power receiving portion moving means 26 moves the power receiving portion 25 is moved in the lateral direction of the article transport vehicle 2 by this rotation, which may make it impossible to maintain the positional relationship between the electricity supply line 24 and the power receiving portion 25 within the proper range.

However, the converging and diverging travel rails 33 are provided at the diverging portions 30 and the converging portions 31 in the article transport facility in accordance with the present invention. And the converging and diverging travel rails 33 guide the guided wheels 32 provided to the travel portions 10, thus, preventing the travel portions 10 from rotating inadvertently about vertical axes with respect to the vehicle main body 9. Therefore, since the positional relationship between the electricity supply line 24 and the power receiving portion 25 can be maintained in the proper range also when traveling in a diverging portion 30 and in a converging portions 31 so that electricity can be supplied properly from the electricity supply line 24 to the power receiving portion 25.

Alternative Embodiments (1) Although the power receiving portion moving means 26 includes the pinion portion 28 and the rack portion 29 in the embodiment described above, it is not limited to the pinion portion 28 and the rack portion 29 structure and the power receiving portion moving means 26 can be configured using other structures.

Figure 12:
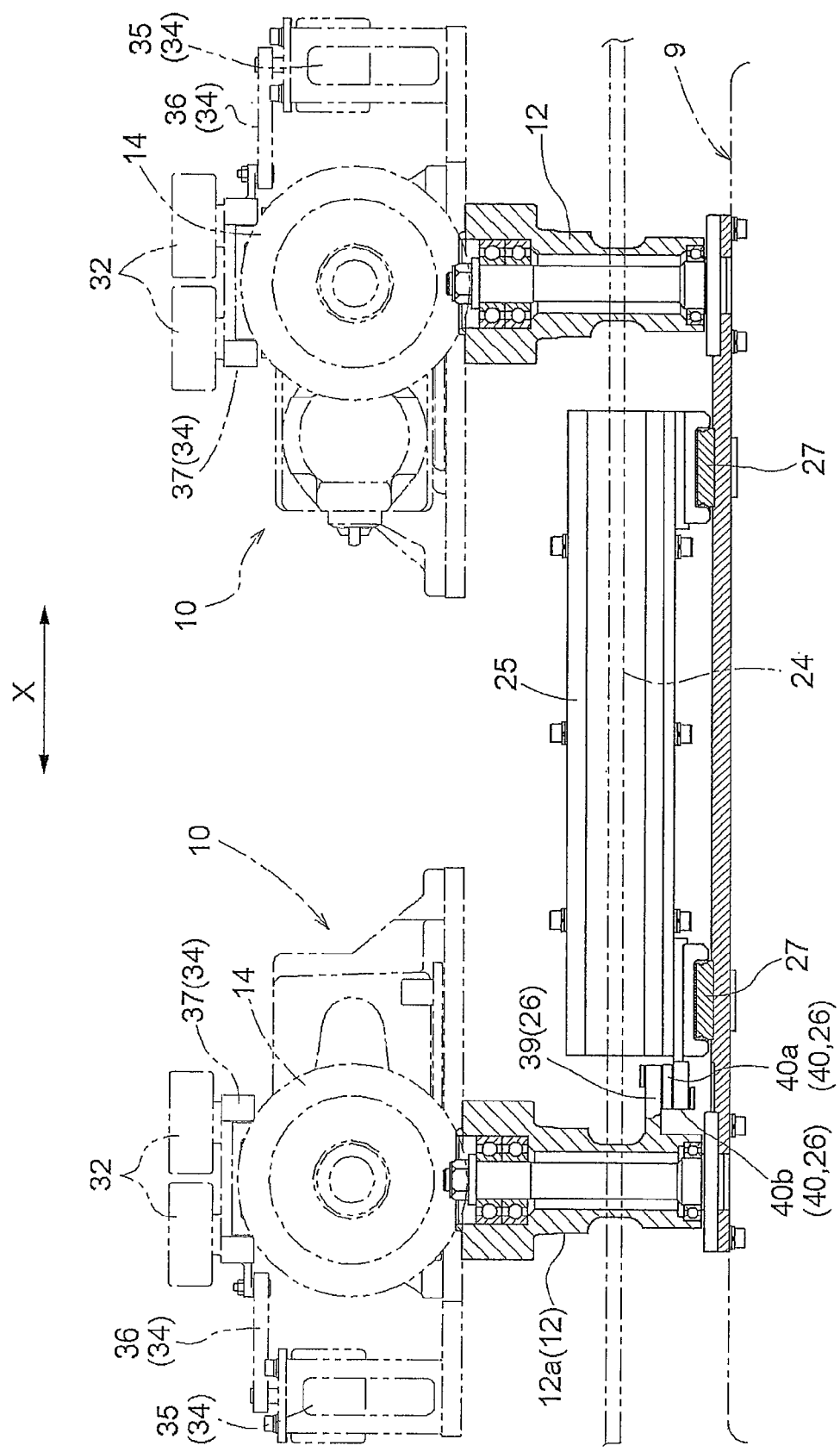
FIG. 12 is a side view showing the power receiving portion moving means in an alternative embodiment.
Figure 13:
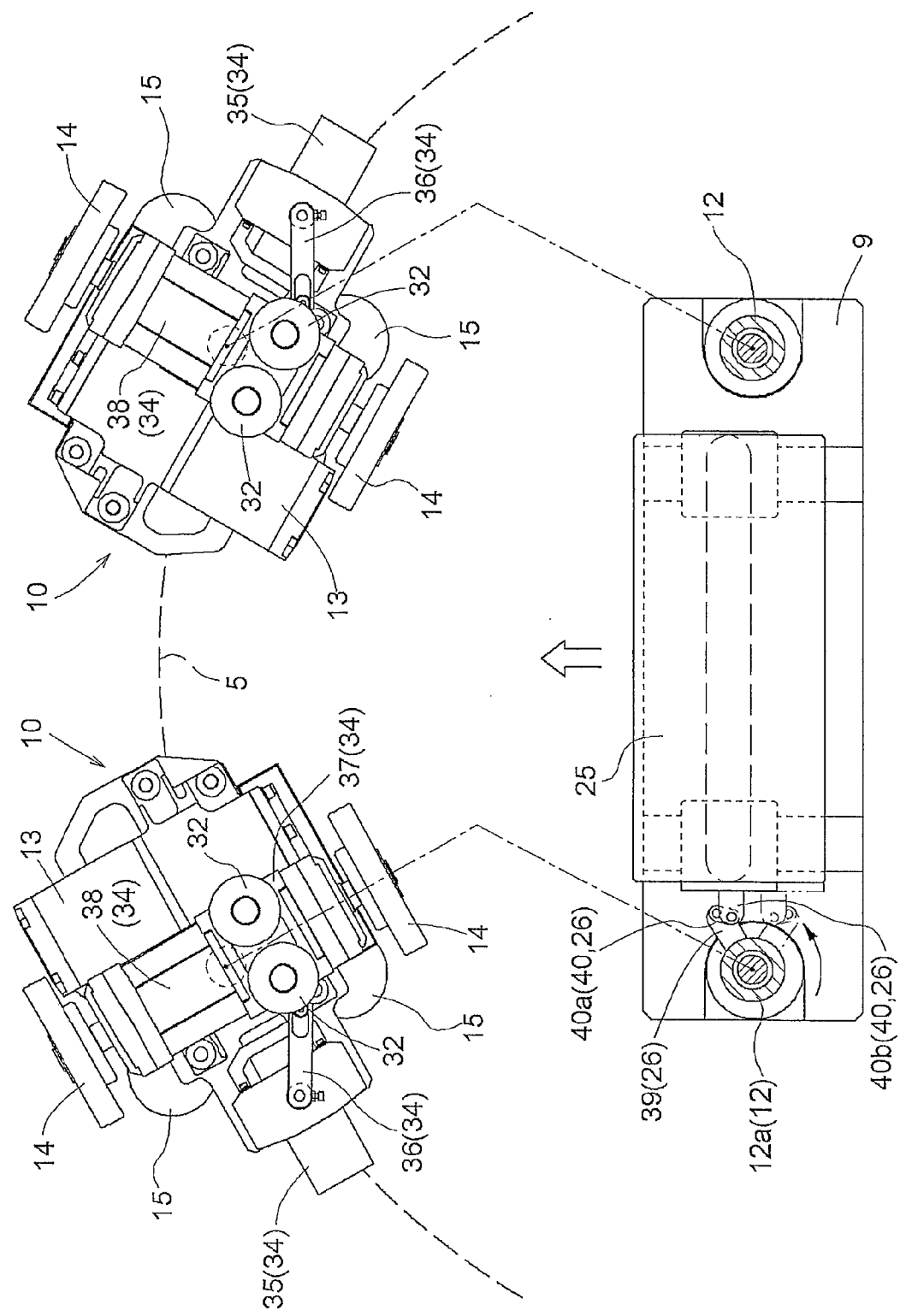
FIG. 13 is a plan view showing the power receiving portion moving means in an alternative embodiment.

For example, as shown in FIGS. 12 and 13, the power receiving portion moving means 26 may be configured to include a pivot portion 39 that can be pivoted in unison with the connecting shaft 12, and a link portion 40 which operatively links the motion of the pivot portion 39 with the motion of the power receiving portion 25 such that the power receiving portion 25 is moved in the lateral direction of the article transport vehicle 2 by the pivoting of the pivot portion 39. The link portion 40 may include a first link portion 40a the one end portion of which is pivotably connected to the distal end portion of the pivot portion 39 and a second link portion 40b one end portion of which is pivotably connected to the other end portion of the first link portion 40a and the other end portion of which is fixed to the power receiving portion 25.

Alternatively, other conventional technology may be used as the power receiving portion moving means. For example, instead of the pinion and the rack portion of the embodiment described above, a pair of rubber wheels may be used which are in frictional engagement with each other. Alternatively, a sensor for measuring rotation of the connecting shaft 12 and a linear motor for moving the power receiving portion 25 depending on the output from this sensor may be used. Further, a stepping motor may be used as any of the motors disclosed in the present specification.

(2) In the embodiment described above, although two electricity supply lines, the first electricity supply line 24a and the second electricity supply line 24b are provided as the electricity supply lines, only one electricity supply line, for example, may be provided. In addition, although two travel rails 1, or a pair of right and left travel rails 1, are provided on both sides in the lateral direction of the article transport vehicle 2, only one travel rail 1, for example, may be provided.

(3) In the embodiment described above, although the vehicle main body 9 is suspended and supported by the travel portions 10 at a position below the travel rails 1, the vehicle main body 9 may also be provided above the travel portions 10, for example, so that the positional relationship between the vehicle main body 9 and the travel portion 10 in the vertical direction is reversed. In addition, the travel portions 10 do not have to be provided as a pair, and only one travel portion, for example, may be provided.

INDUSTRIAL APPLICABILITY

The present invention can be used as an article transport facility used in such place as a warehouse, or a production facility. Description of the reference numerals and symbols
1 Travel Rail
2 Article Transport Vehicle
4 Straight Portion
5 Curved Portion
7 Article
9 Vehicle Main Body
10 Travel Portion
12 Connecting Shaft
13 Drive Motor
14 Travel Wheel
15 Guide Wheel
24 Electricity Supply Line
24a First Electricity Supply Line
24b Second Electricity Supply Line
25 Power Receiving Portion
26 Power Receiving Portion Moving Means
27 Guide Rail
28 Pinion Portion
29 Rack Portion
30 Converging Portion
31 Diverging Portion
32 Guided Wheel
33 Converging and Diverging Travel Rail

The invention claimed is:

1. An article transport facility comprising:
a travel rail;
an article transport vehicle that includes a power receiving portion to which driving electric power is supplied contactlessly from an electricity supply line provided along the travel rail and that is capable of traveling while being guided by the travel rail;
wherein
the travel rail and the electricity supply line extend along a predetermined travel path that is formed by combining a straight portion and a curved portion; wherein the article transport vehicle includes a vehicle main body, and a travel portion having a guide wheel that contacts and is guided by the travel rail with respect to a horizontal direction and a travel wheel that is driven and rotated and that contacts the travel rail, wherein the travel portion is connected to the vehicle main body by a connecting shaft such that the travel portion is rotatable about a vertical axis with respect to vehicle main body, wherein the power receiving portion is supported by the vehicle main body such that the power receiving portion can be moved in a lateral direction of the article transport vehicle, and wherein the article transport vehicle includes power receiving portion moving means for moving the power receiving portion outwardly of the curved portion in the lateral direction of the article transport vehicle in association with a rotation of the connecting shaft as the travel portion rotates about the vertical axis with respect to the vehicle main body while traveling in the curved portion.

2. The article transport facility as defined in claim 1, wherein a pair of right and left travel rails are provided as the travel rail with one travel rail provided on one side and the other travel rail provided on the other side in the lateral direction of the article transport vehicle, wherein the travel portion is capable of travelling on the travel rails by means of the travel wheel, wherein the vehicle main body is suspended and supported by the travel portion at a position below the travel rails by means of the connecting shaft, wherein the connecting shaft is located in a center portion of a gap between the pair of right and left travel rails in the lateral direction of the said article transport vehicle, wherein the electricity supply line is located at a position that is displaced from the connecting shaft in the lateral direction of the said article transport vehicle.

3. The article transport facility as defined in claim 2, wherein provided as the electricity supply line are a first electricity supply line provided at a position that is displaced to one side from the connecting shaft in the lateral direction of the said article transport vehicle, and a second electricity supply line provided at a position that is displaced to the other side from the connecting shaft in the lateral direction of the said article transport vehicle.

4. The article transport facility as defined in claim 1, wherein a pair of front and back travel portions are provided as the travel portion such that the travel portions are spaced apart from each other in a fore and aft direction of the article transport vehicle, wherein each of the front and back travel portions is connected to the vehicle main body by the connecting shaft such that the travel portion is rotatable about the vertical axis with respect to vehicle main body, wherein the power receiving portion moving means is configured to move the power receiving portion in the lateral direction of the article transport vehicle in association only with the rotation of the connecting shaft that connects one of the pair of front and back travel portions with the vehicle main body.

5. The article transport facility as defined in claim 1, wherein the power receiving portion is supported by a guide rail that is provided to the vehicle main body and that extends in the lateral direction of the article transport vehicle such that the power receiving portion can be moved in the lateral direction of the said article transport vehicle, wherein the power receiving portion moving means includes a pinion portion that can be rotated in unison with the connecting shaft and a rack portion that is formed in the power receiving portion to extend along the lateral direction of the article transport vehicle and that meshes with the pinion portion.

6. The article transport facility as defined in claim 1, wherein provided at an intermediate location in the predetermined travel path is at least one of: a converging portion in which a plurality of travel paths, including at least a travel path of the curved portion, merge; and a diverging portion in which a travel path diverges to a plurality of travel paths that include at least a travel path of the curved portion, and wherein the travel rail is provided only on one side in the lateral direction of the article transport vehicle in the converging portion and in the diverging portion and wherein a pair of right and left travel rails are provided with one travel rail provided on one side and the other travel rail provided on the other side in the lateral direction of the article transport vehicle in portions other than the converging portion and the diverging portion, and wherein provided in the converging portion and in the diverging portion is a converging and diverging travel rail that contacts and guides a guided wheel provided to the travel portion to allow the travel portion to perform a converging travel and to allow the travel portion to perform a diverging travel.

* * * * *